United States Patent Office 3,270,091
Patented August 30, 1966

3,270,091
HYDROXYPHENYLALKANE PHOSPHONIC ACIDS
AND ESTERS THEREOF
John D. Spivack, Spring Valley, N.Y., assignor to Geigy
Chemical Corporation, Greenburgh, N.Y., a corporation
of Delaware
No Drawing. Filed May 5, 1965, Ser. No. 453,467
14 Claims. (Cl. 260—932)

This application is a continuation-in-part of copending application Serial No. 187,207, filed April 13, 1962, now abandoned, which in turn is a continuation-in-part of copending application Serial No. 102,958, filed April 14, 1961, now abandoned.

This invention relates to a method of stabilization with a carbon-bonded phosphorus derivative and to novel compositions stabilized thereby. The invention also relates to novel substituted phosphonic acids, phosphonates and phosphinates.

Natural or synthetic resins, such as polypropylene and polyethylene, are often subject to oxidative deterioration. Other unstable organic materials, such as synthetic lubricants, hydrocarbons, natural and synthetic rubbers, oils of animal or vegetable origins, etc. are also unstable to thermal and/or oxidative deterioration. Such materials may also be unstable to ultraviolet and/or visible light.

It is an object of the present invention, therefore, to provide stable organic material by incorporating in such unstable organic material, normally subject to deterioration, a stabilizing amount of a stabilizer. Other objects of the invention will be apparent from what follows hereinafter.

It has now surprisingly been found that the stabilizers of the invention are effective in various organic materials, normally subject to oxidative deterioration. One class of stabilizers of the invention comprises those substituted phosphonic acids, phosphonates and phosphinates of the Formula I:

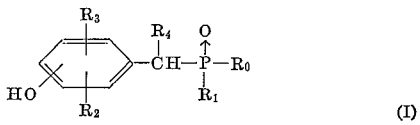

wherein $R_0$ represents hydroxy, alkylthio, alkylthioalkoxy or alkoxy,
$R_1$ represents hydroxy, alkylthio, alkylthioalkoxy or phenyl,
$R_2$ represents an alkyl group,
$R_3$ represents an alkyl group, or hydrogen, and
$R_4$ represents a lower alkyl group or hydrogen.

In the Formula I, some illustrative groups represented by $R_0$ are alkoxy groups having from 1 to 24 carbon atoms, i.e. methoxy, ethoxy, isopropoxy, propoxy, butoxy, secondary butoxy, tertiary butoxy, pentoxy, hexoxy, heptoxy, octyloxy, nonyloxy, decyloxy, undecyloxy, dodecycloxy, tridecyloxy, tetradecyloxy, pentadecyloxy, hexadecyloxy, heptadecyloxy, octadecyloxy, nonadecyloxy, eicosoxy, heneicosoxy, docosoxy, tricosoxy, tetracosoxy; alkylthio groups having 1 to 24 carbon atoms, i.e. methylthio, ethylthio, isopropylthio, propylthio, butylthio, sec. butylthio, t-butylthio, pentylthio, hexylthio, heptylthio, octylthio, nonylthio, decylthio, undecylthio, dodecylthio, tridecylthio, tetradecylthio, pentadecylthio, hexadecylthio, heptadecylthio, octadecylthio, nonadecylthio, eicosylthio, heneicosylthio, docosylthio, tricosylthio, tetracosylthio; alkylthioalkyloxy groups, preferably having 3 to 40 carbon atoms, e.g. methylthioethyloxy, octylthiopropyloxy, dodecylthiobutoxy, octadecylthioethoxy, docosylthiohexoxy, octadecylthioethoxy, etc.

Some illustrative groups represented by $R_1$ in Formula I are alkylthio groups having 1 to 24 carbon atoms, i.e. methylthio, ethylthio, isopropylthio, propylthio, butylthio, sec. butylthio, t-butylthio, pentylthio, hexylthio, heptylthio, octylthio, nonylthio, decylthio, undecylthio, dodecylthio, tridecylthio, tetradecylthio, pentadecylthio, hexadecylthio, heptadecylthio, octadecylthio, nonadecylthio, eiscosylthio, heneicosylthio, docosylthio, tricosylthio, tetracosylthio; alkylthioalkoxy groups, preferably having 3 to 40 carbon atoms, e.g. methylthioethyloxy, octylthiopropyloxy, dodecylthiobutoxy, nonadecylthioethoxy, docosylthiohexoxy, octadecylthioethoxy, etc.

Some illustrative groups for $R_2$ and $R_3$ are alkyl groups, e.g. alkyl having from 1 to 18 carbon atoms, preferably having from 1 to 6 carbon atoms, especially tertiary butyl; also methyl, ethyl, n-propyl, isopropyl, n-butyl, secondary butyl, pentyl, hexyl, heptyl, octyl, nonyl, decyl, undecyl, dodecyl, tridecyl, tetradecyl, pentadecyl, hexadecyl, heptadecyl, octadecyl.

Some illustrative groups for $R_4$ are lower alkyl groups, e.g. methyl, ethyl, propyl, isopropyl, n-butyl, secondary butyl, tertiary butyl, pentyl, hexyl.

Among the compounds of the Formula I, the phosphonates and phosphinates are preferred.

Another class of stabilizers within the scope of this invention are diphosphonates of the formula:

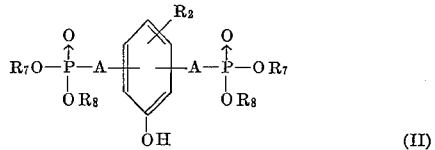

wherein each of A is alkylene, $R_2$ is alkyl, and each of $R_7$ and $R_8$ are alkyl.

In the foregoing series of compounds represented by the Formulae I and II those with the hydroxyl group in the ortho or para position with respect to the carbon-substituted phosphorus group are preferred. Moreover, it is understood that large, bulky substituents, e.g. tertiary alkyl groups, in the preferred embodiment of the invention, are not present on adjacent carbon atoms of the hydroxyphenyl nucleus and also in the preferred embodiment at least one substituent in the hydroxyphenyl nucleus is in the position ortho to the hydroxyl group of said nucleus.

Up to the present time, the use of the compounds of the invention in stabilizing polymeric material has not been known. It has been found also that other organic materials are stabilized against oxidative deterioration by incorporating therein an effective quantity of at least one of the substituted phosphonates or phosphinates according to the invention. Polypropylene, for example, is advantageously stablized with from about 0.01% to about 10% by weight of substituted phosphonate or phosphinate stabilizer of the invention, the preferred range being from about 0.1% to 1%.

For example, compounds of the Formula II are surprisingly more effective in stabilizing films and filaments or fibers of polyolefins, such as polypropylene than the compounds of the prior art. In this specification it is understood that polymeric material includes polyhaloolefins, e.g. polyvinyl chloride; polyolefins, such as polyethylene, polypropylene, polybutene, etc., preferably those which are normally solid at room temperature. Preferably, the polyolefins are of high molecular weight, e.g. above 1000 into the hundreds of thousands range. The polyethylenes may be of the high density, medium density or low density class. The preferred polymeric material for stabilization is polypropylene.

Polymeric material, such as the foregoing, finds use as thermoplastic molding or coating agents. Moreover, because of its high dielectric strength and its resistance to water, such material is particularly useful as insulators or dielectrics in condensers and other similar equipment. It is known that these polyolefins, e.g. polyethylene and polypropylene, are attacked by oxygen, particularly when exposed to the atmosphere and at elevated temperatures. For example, during use or manufacture, the desirable properties of the polyolefins may be impaired due to oxidative deterioration. Such degradation causes loss in dielectric properties, discoloration, embrittlement, gelation, etc. Such material is also stabilized against degradation due to thermal effects or light according to the invention.

Not only homopolymeric material, but also copolymers and physical mixtures thereof, are stabilized according to the present invention. For example, high impact polystyrene containing copolymers of butadiene and styrene may be stabilized according to the invention.

The invention is also particularly useful in stabilizing lubricating oils of various types including aliphatic esters, polyalkylene oxides, silicones, esters of phosphoric and silicic acids, highly fluorine-substituted hydrocarbons, etc. Specifically, such aliphatic esters which are usefully stabilized comprise dihexyl azelate, di-(2-ethylhexyl)azelate, di - (3,5,5-trimethylhexyl)glutarate, di-(3,5,5-trimethylpentyl)glutarate, di - (2 - ethylhexyl) pimelate, di-(2-ethylhexyl)adipate, diisoamyl adipate, triamyl tricarballylate, pentaerythritol tetracaproate, dipropylene glycol dipelargonate, 1,5 - pentanediol - di-(2-ethylhexanoate), etc. Other specific lubricants include polyisopropylene oxide, polyisopropylene oxide diether, polyisopropylene oxide diester, etc., as well as methyl silicone, methylphenyl silicone, tetraisooctyl silicate, etc. and fluorinated oil, e.g. perfluorohydrocarbons.

The present invention also relates to the stabilization of fatty materials, including oils of animal or vegetable origin which tend to deteriorate on standing or exposure to atmospheric oxygen. Also within the scope of the invention are saturated and unsaturated hydrocarbons which tend to deteriorate on storage and use, such as e.g. gasolines, jet fuels, diesel oils, mineral oils, etc. Such hydrocarbons are protected against gum formation, discoloration, and other deterioration with the substituted phosphonate and/or phosphinate stabilizers of the present invention. Greases and cutting oils may be stabilized with the stabilizers of the invention.

Synthetic oils, such as trimethylol propane esters of acetic acid, n-valeric acid, hexanoic acid, caprylic acid, pelargonic acid, 2-ethylhexanoic acid, 2-ethylpropanoic acid, and 2-methylpentanoic acid, and mixtures thereof are also effectively stabilized with the foregoing stabilizers.

The substituted phosphonate and phosphinate stabilizers of the invention are also useful in stabilizing rubber, e.g. artificial rubber. Natural rubber is also stabilized with the substituted phosphonates and phosphinates of the invention. Other examples of rubber which may be stabilized according to the invention include polybutadiene rubber, polyisoprene rubber, styrene-butadiene rubber, butyl rubber, nitrile rubber, neoprene rubber and blends of artificial rubber with natural rubber, such as e.g. natural rubber with polybutadiene rubber. In fact, any rubber subject to degradation is within the scope of the present invention.

It is understood that these stabilizers of the invention are not necessarily of equivalent potency. The specific stabilizers most useful to a given unstable material will depend upon several factors for its advantages. Availability and cost of raw materials for the manufacture of the stabilizer and effective inhibitory action of the stabilizer on the unstabilized material, including duration and degree of activity, are among the factors which control the choice of a specific stabilizer for a specific unstable material which is normally subject to deterioration. Toxicity, color, stability to light and/or heat and solubility are also important factors.

In general, stabilizers of the invention are employed in a concentration of from about 0.01% to about 10% by weight, preferably from about 0.1% to about 1% by weight. Specific concentration used varies with the unstabilizer material and the specific stabilizer, as noted above. When mixtures of two or more stabilizers are employed in an unstable material, usually the total amount of added stabilizer does not exceed 10% of the total stabilized material.

The substituted phosphonate and phosphinate stabilizers of this invention may be used also to stabilize organic material in combination with other additive agents, such as e.g. antioxidants, antiozonants, pourpoint depressants, corrosion and rust inhibitors, dispersing agents, chelating agents, surface active agents, demulsifiers, anti-foaming agents, carbon black, accelerators, plasticizers, color stabilizers, heat stabilizers, ultra-violet absorbers, dyes and pigments, fillers, etc.

The compounds of the present invention may be prepared by treatment of an appropriate alkylhydroxyphenylalkylene halide, such as for example, a chloride, with a tertiary phosphite, tertiary dithiophosphite or a secondary phosphite; by treatment of an alkylhydroxyphenylalkylene magnesium halide with a secondary halophosphate; by esterification of an alkylhydroxyphenylalkylene phosphonic acid or phosphonyl halide, by transesterification, by acid or alkaline hydrolysis of phosphonate diesters, by controlled oxidation of phosphonite diesters, and the like. Such procedures are more fully illustrated by the following examples. In these examples, parts are expressed by weight unless otherwise indicated and the relationship of parts by weight to parts by volume is as that of grams to cubic centimeters. Temperature is expressed in degrees centigrade.

The present invention also contemplates new compounds of the formula:

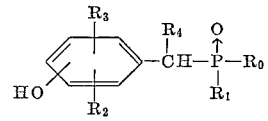

wherein $R_0$ is hydroxy, alkylthio, alkylthioalkoxy, alkoxy, alkylthioalkylthio or alkylthioalkylthioalkoxy, $R_1$ is hydroxy, alkylthio, alkylthioalkoxy, phenyl, alkylthioalkylthio or alkylthioalkylthioalkoxy, $R_2$ is alkyl, $R_3$ is alkyl or hydrogen, and $R_4$ is alkyl or hydrogen.

Illustrative members of $R_0$, $R_1$, $R_2$, $R_3$ and $R_4$ are given hereinabove. In addition, it has now been found that if either or both of $R_0$ and $R_1$ are alkylthioalkylthio or alkylthioalkylthioalkoxy, efficient stabilizers are obtained. Illustrative of such alkylthioalkylthio groups, preferably having 3 to 40 carbon atoms are methylthioethylthio, octylthiopropylthio, dodecylthiobutylthio, octadecylthioethylthio, docosylthiohexylthio, dodecylthioethylthio, also octadecyl-2-thioethylthioethoxy and the like.

Special mention is made of three especially effective polypropylene stabilizers: Di-(n-octadecyl-2-thioethylthioethyl) 3,5-di-t-butyl-4-hydroxybenzylphosphonate; S,S-di-(n-dodecyl-2-thioethyl) 3,5-di-t-butyl - 4 - hydroxybenzyldithiophosphonate; and S,S-di-(n-octadecyl-2-thioethyl) 3,5-di-t-butyl-4-hydroxybenzyldithiophosphonate.

*Example 1.—2-t-butyl-4-chloromethyl-6-methylphenol*

Gaseous hydrogen chloride is bubbled through a dispersion of 46.8 parts of paraformaldehyde dispersed in 80 parts by volume of glacial acetic acid at a temperature of 15 to 22° over a period of 25 minutes. The reaction mixture is cooled to —12° and 81.6 parts of 2-methyl-6-t-butylphenol dissolved in 40 parts by volume of glacial acetic acid is added dropwise over a period of 1.5 hours at —9° while a rapid stream of gaseous hydrogen chloride is passed through the reaction mixture. After the addition is over, the reaction mixture is stirred for 30 minutes, and 80 parts by volume of water added at −8°. The lower acetic acid layer is discarded while the upper layer is taken up in 80 parts by volume of benzene. The benzene solution is washed with saturated sodium chloride solution and freed of a small amount of turbidity by centrifugation; then dried over anhydrous mangesium sulfate. The drying agent is removed by filtration and the benzene and residual volatile material by distillation at 0.2 to 2 mm. Hg nitrogen pressure. The residual 2-t-butyl-4-chloromethyl-6-methylphenol (62 parts) is obtained as a viscous brown oil of 87% purity. The product is used as an intermediate as such.

*Example 2.—2,6-di-t-butyl-4-chloromethylphenol*

Gaseous hydrogen chloride is bubbled through a dispersion of 19.5 parts of paraformaldehyde (0.65 mole) in 1000 parts by volume of glacial acetic acid at 15 to 20°. A clear solution results after 20 minutes. 103 parts of 2,6-di-t-butylphenol (0.5 mole) dissolved in 50 parts by volume of glacial acetic acid is added over a period of 5 minutes at 17 to 30°, the introduction of hydrogen chloride being continued. After the addition is complete the reaction mixture is stirred at 25 to 27° for 45 minutes while hydrogen chloride is being introduced. The reaction mixture is poured into a separatory funnel, the lower acetic acid water layer (about 130 parts by volume being set aside). The upper layer is taken up in 150 parts by volume of benzene and washed successively with saturated sodium chloride solution, saturated sodium bicarbonate solution and 9% sodium bisulfite solution. The benzene layer is finally dried over anhydrous magnesium sulfate. The drying agent is filtered and the clear benzene solution freed of benzene by distillation at 15 to 30 mm. Hg nitrogen pressure. The crude (104 parts) 2,6-di-t-butyl-4-chloromethylphenol is purified by distillation at a vapor temperature of 118 to 121° at 0.8 to 0.9 mm. Hg. The 2,6-di-t-butyl-4-chloromethylphenol so obtained is a yellow oil of 97 to 98% purity.

*Example 3.—2,4-di-t-butyl-6-chloromethylphenol*

Gaseous hydrogen chloride is bubbled through a dispersion of 29.5 parts of paraformaldehyde (equivalent to 0.97 mole of formaldehyde) dispersed in 80 parts by volume of glacial acetic acid at 15 to 20°, a nearly clear solution being obtained within 10 minutes. 83.5 parts of 2,4-di-t-butylphenol dissolved in 40 parts by volume of glacial acetic acid is added dropwise at 25 to 27° over a period of 40 minutes. The reaction mixture is stirred for an additional 45 minutes at 22 to 24°. Gaseous hydrogen chloride is passed through the reaction mixture during the entire addition and stirring periods. The product crystallizes spontaneously, the crystal slurry being separated from the lower acetic acid water. The crystal slurry is then filtered and dried over $P_2O_5$ in a vacuum desiccator at 0.3 mm. Hg pressure, yielding 57.5 parts by 2,4-di-t-butyl-6-chloromethylphenol as white crystals melting at 62–64°. Less pure 2,4-di-t-butyl-6-chloromethylphenol (13 parts) is obtained from the filtrate by dilution with concentrated hydrochloric acid as well as from the acetic acid water phase by dilution with concentrated hydrochloric acid.

*Example 4.—2,6-di-t-butyl-4-α-chloro-ethylphenol*

Gaseous hydrogen chloride is bubbled through a solution of 57 parts of acetaldehyde (1.3 moles) in 100 parts by volume of glacial acetic acid at −5 to +10°. After 20 minutes the initial exothermic reaction subsides 103 parts of 2,6-di-t-butylphenol dissolved in 50 parts by volume of glacial acetic acid is added dropwise over a period of 1.5 hours so that the temperature is maintained at 15 to 16°. Stirring is continued at room temperature for 45 minutes. Gaseous hydrogen chloride is passed through the reaction mixture during the addition and subsequent stirring periods. The reaction mixture is poured into a separatory funnel, the lower acetic acid water layer being discarded. The upper layer is taken up in 100 parts by volume of benzene, the benzene solution being washed successively with water, saturated sodium chloride solution and finally dried over anhydrous magnesium sulfate. The benzene solution is filtered, the clear filtrate being freed of benzene and other residual volatile products by distillation from a water bath held at 30° at a nitrogen pressure of 40 mm. Hg. Finally, the distillation of volatile solvent and traces of acetic acid is removed by distillation at 0.2 mm. Hg pressure. The residual 2,6-di-t-butyl-4-α-chloroethylphenol is obtained as a viscous brown liquid (about 120 parts) of 93% purity. The product is used as such without further purification.

*Example 5.—O-methyl-S,S-di-n-octadecyldithiophosphite*

13.3 parts of methyldichlorophosphite (0.10 mole) is dissolved in 50 parts by volume of n-hexane and added dropwise over a period of 30 minutes at 15 to 20° to a solution of 57.2 parts of n-octadecanethiol (0.20 mole) in 250 parts by volume of n-hexane containing 24.4 parts of dimethylaniline. Since only a small amount of precipitate is visible even after heating the reaction mixture at 60° for 1 hour, 20.2 parts of triethylamine (0.20 mole) is added to the reactants at 40° to 45° over a period of 15 minutes. After removal of the amine hydrochloride by filtration, the hexane solution is washed successively with 5% aqueous hydrochloric acid, water and saturated aqueous sodium bicarbonate. An emulsified phase is extracted with 300 parts by volume of ether. The combined organic solution is dried over anhydrous sodium sulfate. The filtered clear organic layer is concentrated to dryness by distillation at 15 mm. Hg vacuum. The O-methyl-S,S-di-n-octadecyldithiophosphite is obtained a white waxy solid (58 parts) melting at 38 to 40° C. The product can be recrystallized from isopropanol, the melting point remaining unchanged.

*Example 6.—3,5-di-t-butyl-4-hydroxybenzyl-phosphonic acid*

16.4 parts of dimethyl-3,5-di-t-butyl-4-hydroxybenzyl-phosphonate is dissolved in 30 parts by volume of boiling isopropanol and 41.5 parts by volume of concentrated hydrochloric acid is added and the clear reaction solution is heated at reflux for 3 hours. The reaction solution is then diluted with 100 parts by volume of cold water and extracted with several 100 parts by volume portions of ether. The combined ether extract is washed with water and dried over anhydrous sodium sulfate. The ether and other volatile material is removed by distillation at 20 mm. Hg vacuum and finally at about 1 mm. Hg vacuum. The 3,5-di-t-butyl-4-hydroxybenzylphosphonic acid is thus obtained as a light yellow glass soluble in benzene and alcohols and sparingly soluble in water.

Neutralization equivalent weight calculated for $C_{15}H_{25}O_4P$: 300.3%. Found: 314%.

*Example 7.—O-n-butyl-3,5-di-t-butyl-4-hydroxy-benzylphosphonic acid*

34 parts of di-n-butyl-3,5-di-t-butyl-4-hydroxybenzyl-phosphonate is dissolved in a solution of 100 parts by volume of methanol and 40 parts by weight of 50% aqueous sodium hydroxide. The homogeneous reaction mixture is heated at 80° for 19 hours. The reaction product is then dispersed in 500 parts by volume of water and extracted with two portions of 100 parts by volume each of diethyl ether. The combined ether extract is back extracted with 300 parts by volume of water. The combined aqueous phase is made acid to pH 1 with about 40 parts by volume of concentrated aqueous hydrochloric acid and extracted with 300 parts by volume of benzene. The benzene extract is dried over anhydrous sodium sulfate, filtered from the drying agent and freed of benzene by distillation at 15 mm. Hg pressure. The O-n-butyl-3,5-di-t-butyl-4-hydroxybenzylphosphonate is a glass.

Example 8.—2,6-(di-n-butylphosphonomethyl)- 4-t-octylphenol 16.8 parts of 2,6-dichloromethyl-4-t-octylphenol, as described in U.S. 2,488,134, is mixed with 25 parts of tri-n-butylphosphite at room temperature whereupon the reaction mixture spontaneously warms up to about 50°. The reaction mixture is heated at 130° to 170° for 1½ hours during which 9.5 parts of n-butyl chloride is obtained. The 2,6-bis-(di-n-butylphosphonomethyl)-4-t-octylphenol is obtained as a residual free flowing liquid after being freed of traces of volatile by-products by heating at 60 to 70° at about 2 to 3 microns Hg pressure.

Calculated for $C_{32}H_{60}O_7P_2$: P, 10.03%. Found: P, 10.68%.

Example 9.—O-n-octadecyl-3-t-butyl-4-hydroxybenzylphosphonic acid 7.7 parts of 3,5-di-t-butyl-4-hydroxybenzylphosphonic acid is dissolved in 50 ml. of xylene in a 3-neck flask equipped with a nitrogen inlet tube, stirrer, Dean-Stark water trap and condenser. 13.62 parts of octadecanol and 0.1 part of p-toluene sulfonic acid are added and the reactants are heated under reflux for 28 hours while 0.65 part by volume of water is collected in the water trap. The reaction mixture is then diluted with 50 parts by volume of diethyl ether, washed with water to remove the p-toluene sulfonic acid and finally dried over anhydrous sodium sulfate. The solvent is distilled under vacuum and the resulting residue is topped in a molecular still at 220° and 1–5 microns pressure. The viscous residue becomes solid on trituration with acetonitrile. The product, n-octadecyl-3-t-butyl-4-hydroxybenzylphosphonic acid is obtained by successive recrystallization from petroleum ether and hexane as a white crystalline compound melting at 98–100°.

Example 10.—S,S-di-n-octadecyl-3,5-di-thiobutyl-4-hydroxybenzyldithiophosphonate 25.3 parts of O-methyl-S,S-di-n-octadecyldithiophosphite (0.04 mole) is heated together with 10.3 parts of 94% 2,6-di-t-butyl-4-chloromethylphenol (0.04 mole) under 15 mm. Hg nitrogen presure in a 3-neck flask at a temperature of 130 to 135°. The crude S,S-di-n-octadecyl-3,5-di-t-butyl-4-hydroxybenzyldithiophosphonate (34 parts) so obtained is successively triturated with hexane and acetone to wash out colored by-products. After recrystallization from n-hexane S,S-di-n-octadecyl-3,5-di-t-butyl-4-hydroxybenzyldithiophosphonate is obtained as white crystals melting at 68–70°.

Example 11.—O-n-octadecyl-(3,5-di-t-butyl-4-hydroxybenzyl)-benzenephosphinate 5.3 parts of 2,6-di-t-butyl-4-chloromethylphenol (0.02 mole) and 13.4 parts of di-n-octadecylbenzene phosphonite (0.02 mole) are heated together at 130 to 135° at 15 mm. Hg nitrogen pressure for 1¾ hours. The product is then heated at 190–220° for 45 minutes at 0.2 to 0.8 mm. Hg vacuum during which 4.5 parts of liquid distills at a vapor temperature of 125–140°. The residue (13 parts) is dissolved in 125 parts by volume of hot acetonitrile. Benzene (about 25 parts by volume) is gradually added until the precipitated oil becomes a solid at room temperature. The crystalline dispersion is then cooled at 0° and filtered yielding 9 parts of slightly yellow crystalline product. On successive crystallization from acetone, O-n-octadecyl-(3,5-di-t-butyl - 4 - hydroxybenzyl) - benzenephosphinate is obtained as white crystals melting at 81–82°.

In a similar manner, the following compounds are prepared:
O-n-octadecyl-[1-(3,5-di - t - butyl - 4 - hydroxyphenyl)-ethane]-benzenephosphinate,
O-n-docosyl-(3 - t - butyl - 4 - hydroxybenzyl) - benzenephosphinate.

Example 12.—2,6-bis-(di-n-decylphosphonomethyl)-4-t-octylphenol 16.8 parts of 2,6-dichloromethyl-4-t-octylphenol is mixed with 50.2 parts of tri-n-decyl phosphite at room temperature whereupon the reaction mixture spontaneously warms to about 40 to 45°. The reaction mixture is heated at 160 to 180° at 17 mm. Hg over a period of 1½ hours during which 9 parts of decylchloride is distilled. An additional 9 parts of decylchloride is distilled at 1 mm. Hg while being heated at 155–160° for an additional hour. The 2,6-bis-(di-n-decylphosphonomethyl)-4-t-octylphenol is obtained as a residual viscous yellow liquid.

Calculated for $C_{56}H_{108}O_7P_2$: P, 6.50%. Found: P, 6.95%.

Example 13.—Bis-(n-octadecyl-2-thioethyl)-3,5-di-t-butyl-4-hydroxybenzylphosphonate Sodium (0.46 part) is heated and stirred at 100° with a solution of 6 parts of n-octadecylmercaptan in 150 parts by volume of xylene, the dispersion being heated a few minutes at reflux to dissolve the last traces of metallic sodium. A solution of 4.25 parts of bis-(2-chloroethyl)-3,5-di-t-butyl-4-hydroxybenzyl phosphonate in 25 parts by volume of xylene is added dropwise at room temperature over a period of about 15 minutes and allowed to react for 2 hours at room temperature. The reaction mixture is then heated at reflux for 2 hours. After cooling to room temperature the reaction mixture is diluted with an equal volume of ether, the diluted reaction mixture being washed successively with 6% aqueous hydrochloric acid, water, and aqueous sodium bicarbonate.

The organic solution is dried over anhydrous sodium sulfate and freed of solvent by distillation at 20 mm. Hg pressure. The residual product is freed by filtration of small amounts of insoluble impurity by first dissolving in 100 parts by volume of a solvent mixture of 10:1 methanol-acetone, then by dissolving in 70 parts by volume of 5:2 acetonitrile-benzene. The bis-(n-octadecyl-thioethyl)-3,5-di-t - butyl - 4 - hydroxybenzylphosphonate product is isolated as an ivory, pale yellow solid by distilling the solvent at 20 mm. Hg vacuum and finally at 0.5 mm. Hg vacuum.

Calculated for $C_{55}H_{105}S_2O_4P$: P, 3.35%; S, 6.92%. Found: P, 3.50%; S, 6.64%.

The requisite starting material is prepared as follows:
Tris-(2-chloroethyl)phosphite (26.8 parts) is mixed together with 2,6-di-t-butyl-4-chloromethyl phenol (35.5 parts, 71.5%) with stirring at about 100 to 130° under a nitrogen atmosphere for 2½ hours. The product then solidifies on cooling and is crystallized from a solvent mixture of 30 parts by volume of benzene and 200 parts by volume of n-hexane, yielding 33 parts of white crystalline product. On recrystallization once again from cyclohexane, the bis-(2-chloroethyl)-3,5-di-t-butyl-4-hydroxybenzylphosphonate melts at 113–117°.

Calculated for $C_{19}H_{31}Cl_2O_4P$: Chlorine, 16.67%. Found: Chlorine, 17.04%.

In substantially the same fashion as in Example 13, bis-(methyl-2-thioethyl) - 3,5-di-t-butyl-4-hydroxybenzylphosphonate and bis-(n-eicosyl-2-thioeicosyl)-3,5-di-t-butyl-4-hydroxybenzylphosphonate may be obtained.

EXAMPLES—PART III.—STABILIZED MATERIAL

Example 14.—Stabilization of polypropylene

Unstabilized polypropylene powder (Hercules Profax 6501) is thoroughly blended with 0.5% by weight of di-n-octadecyl-3,5-di-t-butyl-4 - hydroxybenzylphosphonate. The blended material is then milled on a two roller mill at 182° for 5 minutes, after which time the stabilized polypropylene is sheeted from the mill and allowed to cool.

The milled polypropylene sheet is then cut into small pieces and pressed for 7 minutes on a hydraulic press at 218° and 2000 pounds per square inch pressure. The resultant sheet of 25 mil thickness is then tested for resistance to accelerated aging in a forced draft oven at 149°. The resultant composition of 0.5% by weight of di-n-octadecyl-3,5-di-t-butyl-4-hydroxybenzylphosphonate and polypropylene is stabilized against oxidative deterioration for over 500 hours. The unstabilized polypropylene deteriorates after only 3 hours.

In like manner as in the foregoing Example 14, stable compositions of polypropylene are prepared having 0.5% by weight of the following compounds:

Di-n-octadecyl-(3-t-butyl-4-hydroxy-5-methylbenzyl)-phosphonate,
Di-n-octadecyl-1-(3′,5′-di-t-butyl-4′-hydroxyphenyl)-ethanephosphonate,
Di-n-octadecyl-3,5-di-t-butyl-2-hydroxybenzylphosphonate,
Di-n-tetradecyl-3,5-di-t-butyl-4-hydroxybenzylphosphonate,
Di-n-hexadecyl-3,5-di-t-butyl-4-hydroxybenzylphosphonate,
Di-n-docosyl-3,5-di-t-butyl-4-hydroxybenzylphosphonate,
Di-p-t-octylphenyl-3,5-di-t-butyl-4-hydroxybenzylphosphonate,
O-n-butyl-3,5-di-t-butyl-4-hydroxybenzylphosphonic acid,
O-n-octadecyl-3-t-butyl-4-hydroxybenzylphosphonic acid,
O-n-decyl-O-phenyl-3,5-di-t-butyl-4-hydroxybenzylphosphonate,
S,S-di-n-octadecyl-3,5-di-t-butyl-4-hydroxybenzyldithiophosphonate,
Diphenyl-3,5-di-t-butyl-4-hydroxybenzylphosphonate,
2,6-bis-(di-n-doceylphosphonomethyl)-4-t-octylphenol,
2,6-bis-(di-n-decylphosphonomethyl)-4-t-octylphenol,
O-n-octadecyl-(3,5-di-t-butyl-4-hydroxybenzyl)-benzenephosphinate,
Bis-(n-octadecyl-2-thioethyl)-3,5-di-t-butyl-4-hydroxybenzylphosphonate.

*Example 15.—Di-(n-octadecyl-2-thioethylthioethyl) 3,5-di-t-butyl-4-hydroxybenzylphosphonate*

Ten and six-tenths grams of bis-(2-chloroethyl)-3,5-di-t-butyl-4-hydroxybenzyl phosphonate and 17.3 g. of n-octadecyl-2-thioethyl mercaptan are dissolved in 50 ml. of dimethyl sulfoxide and heated under nitrogen at 100° C. 3.9 g. of a 51.9% by weight solution of sodium hydroxide in water are added during 7 minutes and the mixture is maintained at 100–105° C. for 1 hour and 40 minutes. The reaction mixture is made acidic with acetic acid and then poured into 500 ml. of cold water. The solid which precipitates is recovered and purified by recrystallization from petroleum ether, M.P. 62–64° C. A stabilized polypropylene composition is prepared by incorporating 0.5% by weight of di-(n-octadecyl-2-thioethylthioethyl) 3,5-di-t-butyl-4-hydroxybenzylphosphonate into polypropylene powder in accordance with the procedure of Example 14.

*Example 16.—S,S-di-(n-dodecyl-2-thioethyl) 3,5-di-t-butyl-4-hydroxybenzyldithiophosphonate*

Twenty-three and one-half grams of O-methyl-S,S-didodecylthioethylthiophosphite and 2.83 g. of tributylamine are mixed and warmed to 70° C. Fifteen and eighty-five hundredths grams of 2,6-di-t-butyl-4-chloromethylphenol is added within 5 minutes and a slight vacuum is applied. The reaction mixture is heated at 100° C. for 5 hours. The product is purified by recrystallization from petroleum ether, M.P. 28–31° C.

A stabilized polypropylene composition is prepared by incorporating 0.5% by weight of S,S-di-(n-dodecyl-2-thioethyl) 3,5-di-t-butyl-4-hydroxybenzyldithiophosphonate into polypropylene powder in accordance with the procedure of Example 14.

*Example 17.—S,S-di-(n-octadecyl-2-thioethyl) 3,5-di-t-butyl-4-hydroxybenzyldithiophosphonate*

The procedure of Example 16 is repeated substituting a stoichiometrically-equivalent amount of O-methyl-S,S-di-octadecylthioethylthiophosphite. The product melts at 55–57° C.

A stabilized polypropylene composition is prepared by incorporating 0.5% by weight of S,S-di-(n-octadecyl-2-thioethyl) 3,5-di-t-butyl-4-hydroxybenzyldithiophosphonate into polypropylene powder in accordance with the procedure of Example 14.

What is claimed is:

1. A compound of the formula

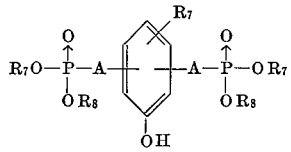

wherein

A is lower alkylene,
$R_2$ is alkyl of from 1 to 18 carbon atoms, and
each of $R_7$ and $R_8$ is alkyl of from 1 to 24 carbon atoms.

2. 2,6 - bis - (di - n-butylphosphonomethyl)-4-t-octylphenol.

3. 2,6 - bis - (di - n-decylphosphonomethyl)-4-t-octylphenol.

4. A compound of the formula:

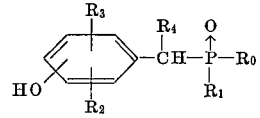

wherein $R_0$ is hydroxy, alkylthio of from 1 to 24 carbon atoms, alkylthioalkoxy of from 3 to 40 carbon atoms, alkoxy of from 1 to 24 carbon atoms, alkylthioalkylthio of from 3 to 40 carbon atoms or alkylthioalkylthioalkoxy of from 3 to 40 carbon atoms;
$R_1$ is hydroxy, alkylthio of from 1 to 24 carbon atoms, alkylthioalkoxy of from 3 to 40 carbon atoms, phenyl, alkylthioalkylthio of from 3 to 40 carbon atoms or alkylthioalkylthioalkoxy of from 3 to 40 carbon atoms;
$R_2$ is alkyl of from 1 to 18 carbon atoms;
$R_3$ is alkyl of from 1 to 18 carbon atoms or hydrogen; and
$R_4$ is alkyl having from 1 to 6 carbon atoms or hydrogen.

5. A compound of the formula:

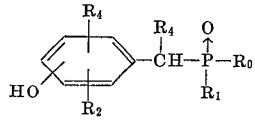

wherein $R_0$ is hydroxy, alkylthio of from 17 to 24 carbon atoms, alkylthioalkoxy of from 3 to 40 carbon atoms, or alkoxy of from 1 to 24 carbon atoms;
$R_1$ is hydroxy, alkylthio of from 1 to 24 carbon atoms; alkylthioalkoxy of from 3 to 40 carbon atoms, or phenyl;
$R_2$ is alkyl of from 1 to 18 carbon atoms;
$R_3$ is alkyl of from 1 to 18 carbon atoms or hydrogen; and
$R_4$ is alkyl having from 1 to 6 carbon atoms or hydrogen.

6. 3,5-di-t-butyl-4-hydroxybenzylphosphonic acid.

7. O - n-octadecyl-3-t-butyl-4-hydroxybenzylphosphonic acid.

8. S,S - di - n - octadecyl-3,5-di-t-butyl-4-hydroxybenzyldithiophosphonate.

9. O-n-octadecyl-(3,5-di-t-butyl-4-hydroxybenzyl)-benzene-phosphinate.

10. Bis-(n-octadecyl-2-thioethyl)-3,5-di-t-butyl-4-hydroxybenzylphosphonate.

11. O-n-butyl-3,5-di-t-butyl-4-hydroxybenzylphosphonic acid.

12. Di-(n-octadecyl-2-thioethylthioethyl)-3,5-di-t-butyl-4-hydroxybenzylphosphonate.

13. S,S-di-(n-dodecyl-2-thioethyl)-3,5-di-t-butyl-4-hydroxybenzyldithiophosphonate.

14. S,S-di-(n-octadecyl-2-thioethyl)-3,5-di-t-butyl-4-hydroxybenzyldithiophosphonate.

No references cited.

CHARLES B. PARKER, *Primary Examiner.*

R. L. RAYMOND, *Examiner.*